(12) United States Patent
Versini

(10) Patent No.: US 6,942,470 B1
(45) Date of Patent: Sep. 13, 2005

(54) MOTOR PUMP SYSTEM WITH AXIAL THROUGH FLOW UTILIZING AN INCORPORATED FLOWMETER AND PRESSURE CONTROLLER

(76) Inventor: Rolland Versini, Notre Dame, Auriol (FR) 13390

( * ) Notice: Subject to any disclaimer, the term of this patent is extended or adjusted under 35 U.S.C. 154(b) by 0 days.

(21) Appl. No.: 09/674,508

(22) PCT Filed: May 14, 1999

(86) PCT No.: PCT/FR99/01158

§ 371 (c)(1),
(2), (4) Date: Mar. 30, 2001

(87) PCT Pub. No.: WO99/60270

PCT Pub. Date: Nov. 25, 1999

(30) Foreign Application Priority Data

May 15, 1998 (FR) .................................. 98 06431
May 15, 1998 (FR) .................................. 98 10989

(51) Int. Cl.[7] .......................... F04B 17/04; F04B 17/00; F04B 49/00
(52) U.S. Cl. .................. 417/417; 417/410.1; 417/415; 417/416; 417/307
(58) Field of Search ................. 417/38, 63, 410.1, 417/423.1, 417, 307, 415, 416

(56) References Cited

U.S. PATENT DOCUMENTS

| | | | | |
|---|---|---|---|---|
| 3,171,071 A | * | 2/1965 | Brown | 318/576 |
| 3,819,303 A | * | 6/1974 | Pfleger | 417/307 |
| 4,124,332 A | * | 11/1978 | Nishijyo | 417/38 |
| 4,160,380 A | | 7/1979 | Dunne, Jr. et al. | |
| 4,265,127 A | * | 5/1981 | Onoda | 73/861.78 |
| 4,496,287 A | * | 1/1985 | Nelson et al. | 417/63 |
| 5,096,390 A | * | 3/1992 | Sevrain et al. | 417/423.7 |
| 5,904,126 A | | 5/1999 | McKay et al. | |
| 6,171,071 B1 | * | 1/2001 | Tzeng et al. | 417/279 |

FOREIGN PATENT DOCUMENTS

| | | | |
|---|---|---|---|
| CH | 675312 | 9/1990 | |
| DE | 4437670 | 4/1996 | |
| FR | 2428827 | 11/1980 | |
| WO | 95/26461 | 10/1995 | |
| WO | WO 95/26462 | * 10/1995 | F01M 3/02 |

OTHER PUBLICATIONS

English Language abstract of DE-4437670.
English Language abstract of WO-95/26461.
English Language abstract of CH-675312.
English Language abstract of FR-2428827.

* cited by examiner

Primary Examiner—Cheryl Tyler
Assistant Examiner—Timothy P. Solak
(74) Attorney, Agent, or Firm—Greenblum & Bernstein, P.L.C.

(57) ABSTRACT

Motor pump system includes an electromagnetic motor comprising a main body, a coil, and a movable hollow free piston. A flow meter is coupled to one end of the electromagnetic motor. A cylinder block is coupled to another end of the electromagnetic motor. At least two non-return valves are included. A water inlet, a water outlet, and a pressure limiting device are also provided. A motor pump system is also provided which includes a motor including main body having an inlet end and an outlet end. A flow meter is coupled to the inlet end. An outlet body is coupled to outlet end. A pressure controller is provided comprising an end piece and a fixed element which is removably coupled to the end piece. The fixed element is coupled to the outlet body.

36 Claims, 2 Drawing Sheets

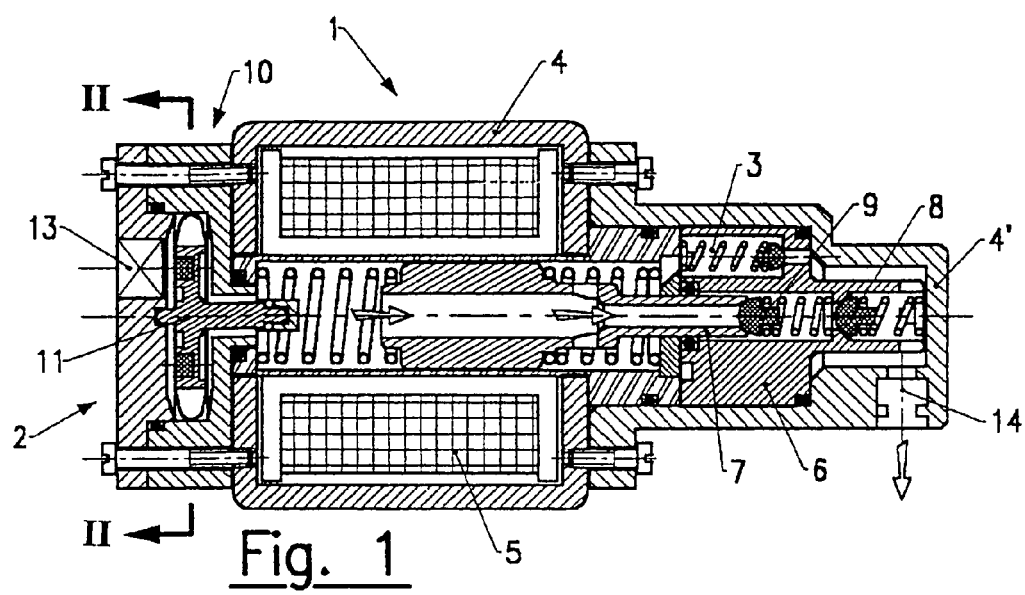
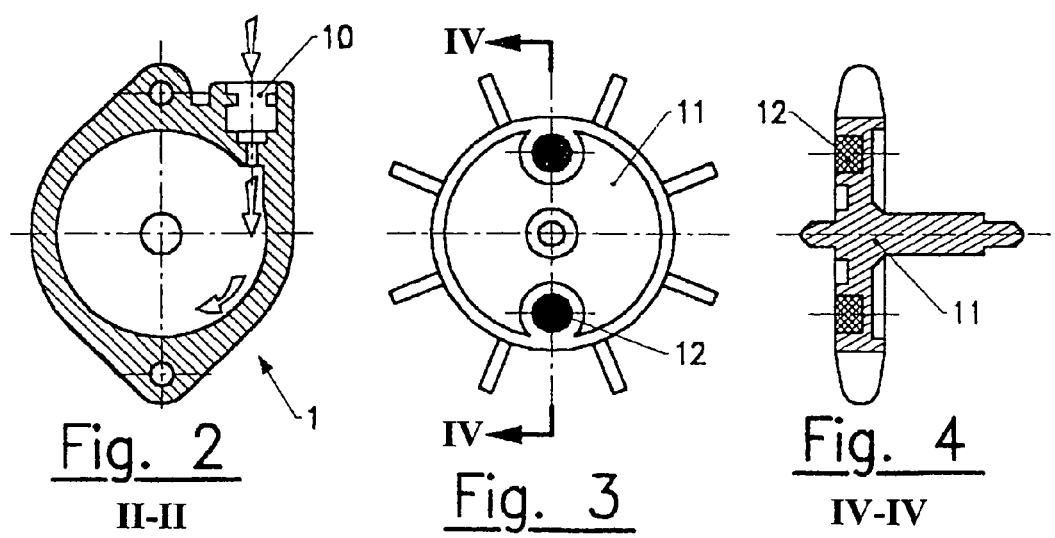
Fig. 1
Fig. 2
II-II
Fig. 3
Fig. 4
IV-IV

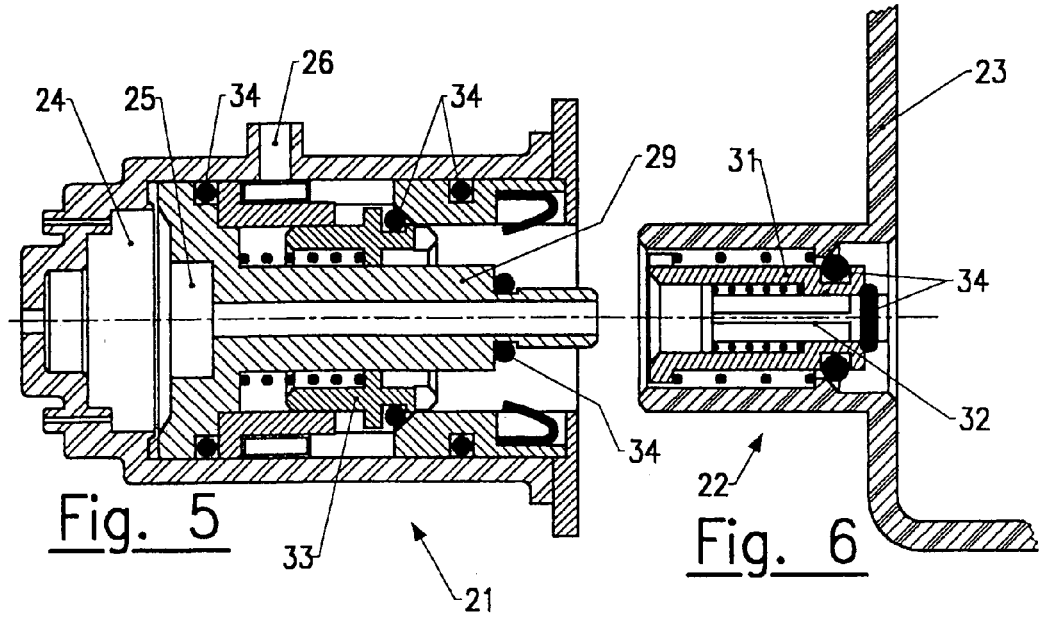
Fig. 5
Fig. 6
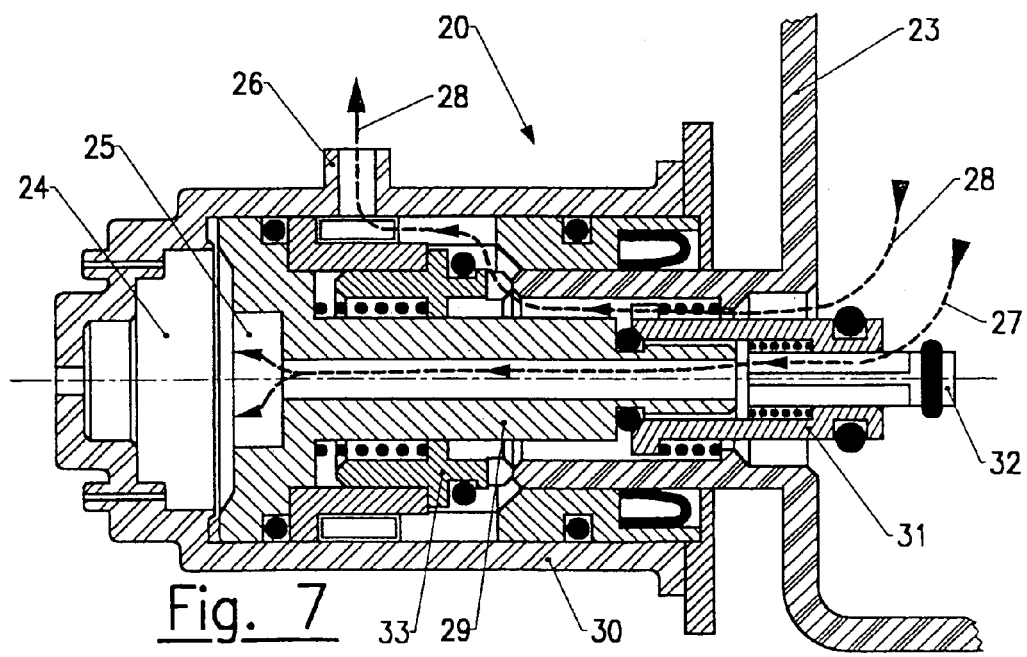
Fig. 7

MOTOR PUMP SYSTEM WITH AXIAL THROUGH FLOW UTILIZING AN INCORPORATED FLOWMETER AND PRESSURE CONTROLLER

CROSS-REFERENCE TO RELATED APPLICATIONS

The present application is a National Stage Application of International Application No. PCT/FR99/01158, filed May 14, 1999. Further, the present application claims priority under 35 U.S.C. § 119 of French Patent Application Nos. 98/06431 and 98/10989, both filed on May 15, 1998.

BACKGROUND OF THE INVENTION

1. Field of the Invention

The present invention relates to an axial through flow motor pump with an incorporated flowmeter and pressure controller.

The invention is particularly adapted to equip automatic coffee machines, but it can be used for numerous other applications requiring pressurized liquid supply from a reservoir.

2. Discussion of Background Information

The French Patent No. FR 98 06 431 filed by the Applicant of the present invention describes a coffee machine comprising a motor pump associated with a pressure controller mounted on the supply circuit and making it possible not only to control the water supply system, but also to remove the reservoir to fill it up due to the fact that the pressure controller is constituted of two elements that can be coupled, one of which is fixed on the frame of the machine and the other to the base of the reservoir, each of these two elements being automatically sealed when they are separated.

The fixed element is connected to the motor pump and is equipped with a flexible membrane acting on an electric contact as a function of the variations in pressure generated by the modifications of the water level in the reservoir. The liquid that penetrates into this element converges to a single chamber in which the flexible membrane and the outlet orifice toward the motor pump are located. Under certain conditions, this arrangement causes an aberrant functioning of the electric contact, in particular during stops and starts of the motor pump.

SUMMARY OF THE INVENTION

The device according to the present invention provides for a system which uses a motor pump incorporating the assembly of the devices for controlling the liquid flow and connected to a particularly reliable supply pressure controller.

The invention utilizes an internal axial flow motor pump, with an electromagnetic motor and a hollow free piston, equipped with an incorporated flowmeter and flow limiting device, and associated with a pressure controller adapted to control its supply and comprising separate internal passages for the liquid flow converging to the motor pump and for connecting to a chamber containing a flexible membrane actuating an electric contact for controlling the motor pump power supply.

According to one aspect of the invention, there is provided a motor pump system comprising an electromagnetic motor comprising a main body, a coil, and a movable hollow free piston, a flow meter coupled to one end of the electromagnetic motor, a cylinder block coupled to another end of the electromagnetic motor, at least two non-return valves, a water inlet, a water outlet, and a pressure limiting device.

The flow meter may comprise a free bucket wheel. The flow meter may further comprise an electromagnetic detector and the free bucket may comprise at least one permanent magnet whose movement is detected by the electromagnetic detector. The pressure limiting device may be a bore provided in the cylinder block and may comprise a calibrated spring-loaded valve which connects the water outlet to a base of the free hollow piston The motor pump may be adapted to recycle water without driving the flow meter when there is back pressure at the water outlet.

The main body may be one of machined in a single piece and made of plastic. The motor pump may be adapted to couple to an automatic coffee machine. The motor pump may be adapted to couple to a device which requires a pressurized liquid supply from a reservoir. The system may further comprise a pressure controller associated with the motor pump. The pressure controller may comprise a chamber. The chamber of the pressure controller may be adapted to receive liquid flow. The pressure controller may further comprise a flexible membrane actuating an electric contact for controlling an automatic liquid supply system. The pressure controller may comprise an outlet orifice for communicating with the motor pump. The pressure controller may be adapted to receive two liquid flows. One of the two flows may be directed to a chamber in the pressure controller via a central passage and another of the two flows may be directed to an outlet orifice via a peripheral passage.

The pressure controller may comprise a fixed element and an end piece. The fixed element may be coupled to one of the motor pump and a frame supporting the motor pump. The end piece may be mounted to a reservoir. The reservoir may communicate with and provide a supply to the motor pump. The fixed element and the end piece may be releasably coupled together. The fixed element and the end piece may be releasably coupled together via a quick connection.

The pressure controller may have a fixed element comprising a body, a hollow piece arranged within the body, and two passages separated by the hollow piece. The pressure controller may further comprise an end piece and an axially movable bush disposed within the end piece. The end piece may further comprise a spring associated with the bush which is adapted to close a peripheral passage. The fixed element may be removably coupled to the end piece such that when the fixed element is uncoupled from the end piece, a central passage is closed by a spring actuated valve. The bush may be slidably disposed with the end piece and the fixed element may further comprise a cylindrical shutter which is slidably disposed around the hollow piece. The cylindrical shutter may be biased via a spring. The cylindrical shutter may be adapted to isolate a liquid circuit communicating with the motor pump so as to prevent a liquid remaining in the motor pump from flowing out of the fixed element when the fixed element is uncoupled from the end piece.

The invention also provides for a motor pump system comprising a motor including a main body having an inlet end and an outlet end, a flow meter coupled to the inlet end, an outlet body coupled to the outlet end, and a pressure controller comprising an end piece and a fixed element which is removably coupled to the end piece, wherein the fixed element is coupled to the outlet body.

The main body may comprise a coil and a movable hollow piston. The flow meter may comprise a free bucket wheel and an electromagnetic detector. The fixed element may comprise a chamber, an electric contact disposed adjacent the chamber, a spring actuated cylindrical shutter, and a hollow piece having a passage which communicates with the chamber. The end piece may comprise a spring actuated movable bush and a valve adapted to close off a central passage. The outlet body may comprise a pressure limiting device, a cylindrical block, and at least two non-return valves disposed with the outlet body.

The invention also provides for a motor pump system comprising a motor including a main body having a first end and a second end, a flow meter coupled to the first end and having an inlet, an outlet body coupled to the second end and having an outlet, a pressure controller comprising a fixed element and an end piece, the fixed element comprising a movable cylindrical shutter and an outlet which is in fluid communication with the outlet of the outlet body, and the end piece coupled to a reservoir and comprising a movable valve, wherein the fixed element is removably coupled to the end piece.

BRIEF DESCRIPTION OF THE DRAWINGS

In the annexed drawings, provided by way of a non-limiting example of one of the embodiments of the invention;

FIG. 1 shows an axial cross-section of the motor pump having an incorporated flowmeter and pressure limiting device;

FIG. 2 shows a transverse cross-section along the arrows F+II—II of FIG. 1;

FIG. 3 shows an enlarged front view of the bucket wheel of the flowmeter;

FIG. 4 shows an axial cross-section along the arrows F2 IV—IV of FIG. 3;

FIGS. 5 and 6 show axial cross-sections of the two separated elements of the pressure controller; and FIG. 7 shows two elements of the pressure controller as assembled, under the same conditions, on a different scale.

DETAILED DESCRIPTION OF THE INVENTION

The device illustrated in FIGS. 1–4, utilizes a liquid supply motor pump 1 having an integral assembly comprising an incorporated flowmeter 2 and pressure limiting device 3. Preferably, it is of the type having a hollow piston with an electromagnetic motor, but it can also be of the type having a controlled piston driven by a rotary engine. In the first case, it is advantageously provided with a main body 4, machined in a single piece made of plastic, one of its ends forming the coil 5 of the electromagnetic motor, the other end containing the cylinder block 6 in which the piston 7 moves, and comprising non-return valves 8 and 9.

The flow meter 2, located in a block closing the main body 4 on the side opposite the cylinder block 6, immediately after the water inlet 10 (see also FIG. 2), is formed of a free bucket wheel 11 and comprises one or several permanent magnets 12 whose passage is detected by an electromagnetic detector 13, having a double function of allowing the stopping of the motor pump once the desired quantity of water has been obtained, and of signaling a possible flaw in the water inlet 10.

The pressure limiting device 3 is located in an outlet body 4' and has a bore provided in the cylinder block 6 containing a calibrated spring-loaded valve connecting the water outlet 14 to the base of the piston 7, such that water is recycled, without driving the flow meter 2 in the case of back pressure at the water outlet 14.

The arrangement of the water inlet 10 and of the flow meter 2 opposite the water outlet 14 causes the passage of water through the motive portion of the pump, along the axis of the latter, which makes it possible to have a direct flow substantially improving the functioning and reliability of the pump as shown by tests.

The motor pump 1 is advantageously associated with a pressure controller 20 mounted on the liquid supply circuit (see FIGS. 5–7).

This pressure controller 20 has a fixed element 21, affixed to the motor pump 1 or to the frame carrying the latter, and of an end piece 22 mounted at the base of the reservoir 23 and connected to it. These two elements constituting a quick connection can be separated so as to render the reservoir 23 detachable without any tool.

The fixed element 21 comprises an electric contact 24 formed of two electrodes and of a flexible membrane carrying a conducting plate that is normally moved away from these electrodes by an elastic device, and establishing the contact with one another when the weight of the liquid present in the reservoir 23 pushes back the flexible membrane, the decrease in pressure caused by the level drop in the reservoir having the opposite effect by moving the membrane and the conducting plate away from the electrodes, which cuts off the contact. This device constitutes a very reliable mechanism for controlling the automatic supply systems of the machine.

To avoid the repercussions of the variations in pressure caused by the starts and stops of the motor pump 1 on the membrane of the contact 24, the flow of the liquid penetrating in the pressure controller 20 is divided into two portions directed toward the chamber 25 containing the flexible membrane of the contact 24 and toward the outlet orifice 26 of the pressure controller 20, respectively. This is obtained due to two passages, a central passage 27 leading to the chamber 25, on the one hand, and a peripheral passage 28 leading to the outlet orifice 26, on the other hand. These two passages are separated by a hollow piece 29 arranged in the body 30 of the fixed element 21 and extended by a bush 31 located in the end piece 22.

The bush 31 is axially movable and is associated with a spring so as to close the peripheral passage 28 during the separation of the fixed element 21 and of the end piece 22. Additionally, the central passage 27 is closed by a valve 32 which is also driven by a second spring, and slides in the bush 31.

The fixed element 21 is further provided with a cylindrical shutter 33 adapted to isolate the liquid circuit connected to the motor pump 1 so as to prevent the liquid remaining in the latter from flowing outside. Shutter 33 slides outside the hollow piece 29 and is actuated by a third spring.

The imperviousness of the assembly is ensured in a known fashion by a series of O-rings 34 resting on seats provided for this purpose.

The positioning of the various constituent elements provides the invention with a maximum of useful effects which, to date, had not been obtained by similar devices.

What is claimed is:
1. A motor pump system comprising:
an electromagnetic motor comprising a main body, a coil, and a movable hollow free piston;
a flow meter coupled to one end of the electromagnetic motor;

a cylinder block coupled to another end of the electromagnetic motor;

at least two non-return valves;

a water inlet;

a water outlet; and a pressure limiting device arranged within the cylinder block.

2. The system of claim 1, wherein the flow meter comprises a free bucket wheel.

3. The system of claim 2, wherein the flow meter further comprises an electromagnetic detector and wherein the free bucket comprises at least one permanent magnet whose movement is detected by the electromagnetic detector.

4. The system of claim 1, wherein the pressure limiting device is a bore provided in the cylinder block and comprises a calibrated spring-loaded valve which connects the water outlet to a base of the free hollow piston.

5. The system of claim 4, wherein the motor pump system is adapted to recycle water without driving the flow meter when there is back pressure at the water outlet.

6. The system of claim 1, wherein the main body is one of machined in a single piece and made of plastic.

7. The system of claim 1, wherein the motor pump system is adapted to couple to an automatic coffee machine.

8. The system of claim 1, wherein the motor pump system is adapted to couple to a device which requires a pressurized liquid supply from a reservoir.

9. The system of claim 1, further comprising a pressure controller associated with the motor pump system.

10. The system of claim 9, wherein the pressure controller comprises a chamber.

11. The system of claim 10, wherein the chamber of the pressure controller is adapted to receive liquid flow.

12. The system of claim 10, wherein the pressure controller further comprises a flexible membrane actuating an electric contact for controlling an automatic liquid supply system.

13. The system of claim 9, wherein the pressure controller comprises an outlet orifice for communicating with the motor pump system.

14. The system of claim 9, wherein the pressure controller is adapted to receive two liquid flows.

15. The system of claim 14, wherein one of the two flows is directed to a chamber in the pressure controller via a central passage and wherein another of the two flows is directed to an outlet orifice via a peripheral passage.

16. The system of claim 9, wherein the pressure controller comprises a fixed element and an end piece.

17. The system of claim 16, wherein the fixed element is coupled to one of the motor pump system and a frame supporting the motor pump system.

18. The system of claim 16, wherein the end piece is mounted to a reservoir.

19. The system of claim 18, wherein the reservoir communicates with and provides a supply to the motor pump system.

20. The system of claim 16, wherein the fixed element and the end piece are releasably coupled together.

21. The system of claim 18, wherein the fixed element and the end piece are releasably coupled together via a quick connection.

22. The system of claim 9, wherein the pressure controller has a fixed element comprising a body, a hollow piece arranged within the body, and two passages separated by the hollow piece.

23. The system of claim 22, wherein the pressure controller further comprises an end piece and an axially movable bush disposed within the end piece.

24. The system of claim 23, wherein the end piece further comprises a spring associated with the bush which is adapted to close a peripheral passage.

25. The system of claim 23, wherein the fixed element is removably coupled to the end piece such that when the fixed element is uncoupled from the end piece, a central passage is closed by a spring actuated valve.

26. The system of claim 23, wherein the bush is slidably disposed with the end piece and wherein the fixed element further comprises a cylindrical shutter which is slidably disposed around the hollow piece.

27. The system of claim 26, wherein the cylindrical shutter is biased via spring.

28. The system of claim 26, wherein the cylindrical shutter is adapted to isolate a liquid circuit communicating with the motor pump system so as to prevent a liquid remaining in the motor pump system from flowing out of the fixed element when the fixed element is uncoupled from the end piece.

29. A motor pump system comprising:

a motor including a main body having an inlet end and an outlet end;

a flow meter coupled to the inlet end;

an outlet body coupled to outlet end; and a pressure controller comprising an end piece and a fixed element which is removably coupled to the end piece via a quick connection;

wherein the fixed element is coupled to the outlet body.

30. The system of claim 29, wherein the main body comprises a coil, and a movable hollow piston.

31. The system of claim 29, wherein the flow meter comprises a free bucket wheel and an electromagnetic detector.

32. The system of claim 29, wherein the fixed element comprises a chamber, an electric contact disposed adjacent the chamber, a spring actuated cylindrical shutter, and a hollow piece having a passage which communicates with the chamber.

33. The system of claim 29, wherein the end piece comprises a spring actuated movable bush and a valve adapted to close off a central passage.

34. The system of claim 29, wherein the outlet body comprises a pressure limiting device, a cylindrical block, and at least two non-return valves disposed with the outlet body.

35. A motor pump system comprising:

a motor including a main body having a first end and a second end;

a flow meter coupled to the first end and having an inlet;

an outlet body coupled to the second end and having an outlet;

a pressure controller comprising a fixed element and an end piece;

the fixed element comprising a movable cylindrical shutter and an outlet which is in fluid communication with the outlet of the outlet body; and the end piece coupled to a reservoir and comprising a movable valve, wherein the fixed element is removably coupled to the end piece via a quick connection.

36. A motor pump unit for an automatic coffee machine, the unit comprising:

an electromagnetic motor comprising a main body, a coil, and a centrally arranged movable piston having an internal passage;

a flow meter coupled to a first axial end of the electromagnetic motor;

a cylinder block coupled to a second axial end of the electromagnetic motor;

the first and second axial ends being arranged opposite one another;

two non-return valves arranged within the unit;

a water inlet allowing water to enter into the unit from the first axial end;

a water outlet allowing water to exit the unit from the second axial end; and a pressure limiting device arranged within the unit;

wherein the unit is structured and arranged to allow water to move from the water inlet, through the internal passage of the centrally arranged movable piston, and out through the water outlet.

* * * * *